United States Patent
Haddad

(10) Patent No.: US 9,320,258 B2
(45) Date of Patent: Apr. 26, 2016

(54) ABSORBING PAD WITH SECURING ELEMENTS FOR PET EXCRETORY COLLECTION AND DISPOSAL

(71) Applicant: Rogerio Jose Jovino Haddad, Sao Paulo (BR)

(72) Inventor: Rogerio Jose Jovino Haddad, Sao Paulo (BR)

( * ) Notice: Subject to any disclaimer, the term of this patent is extended or adjusted under 35 U.S.C. 154(b) by 109 days.

(21) Appl. No.: 14/215,725

(22) Filed: Mar. 17, 2014

(65) Prior Publication Data

US 2014/0261209 A1    Sep. 18, 2014

Related U.S. Application Data

(60) Provisional application No. 61/788,114, filed on Mar. 15, 2013.

(51) Int. Cl.
*A01K 1/01* (2006.01)
*A61F 13/15* (2006.01)

(52) U.S. Cl.
CPC .................................. *A01K 1/0107* (2013.01)

(58) Field of Classification Search
CPC . A01K 1/0107; A01K 1/0157; A01K 1/0353; A61F 2013/15186; A61F 5/485
USPC ......... 119/161, 28.5, 169, 170; 604/358, 378, 604/385.01, 385.201, 385.23, 386, 389
See application file for complete search history.

(56) References Cited

U.S. PATENT DOCUMENTS

| | | | | | |
|---|---|---|---|---|---|
| 3,284,273 | A | * | 11/1966 | Prentice | A61F 5/485 119/169 |
| 3,626,899 | A | * | 12/1971 | Spellman | A01K 15/02 119/169 |
| 4,800,677 | A | * | 1/1989 | Mack | A01K 1/0107 119/161 |
| 5,630,376 | A | * | 5/1997 | Ochi | A01K 1/0107 119/169 |
| 6,227,145 | B1 | * | 5/2001 | Miyamoto | A01K 1/0107 119/163 |
| 6,976,451 | B2 | * | 12/2005 | Helfman | A01K 1/0107 119/169 |
| 7,249,570 | B1 | * | 7/2007 | Roberson | A01K 1/0107 119/169 |
| 7,748,348 | B2 | * | 7/2010 | Hurwitz | A01K 1/0107 119/168 |
| 7,891,320 | B2 | * | 2/2011 | Otsuji | A01K 1/0107 119/169 |
| 7,975,650 | B2 | * | 7/2011 | Vicari | A01K 1/0107 119/169 |
| 8,042,490 | B2 | * | 10/2011 | Takahashi | A01K 1/0157 119/169 |
| 8,336,497 | B2 | * | 12/2012 | van Zuilekom | A01K 1/0107 119/165 |
| 8,640,649 | B2 | * | 2/2014 | Matsuo | A01K 1/0107 119/166 |
| 8,852,717 | B2 | * | 10/2014 | Davis | A01K 1/0107 119/169 |
| 2006/0200105 | A1 | * | 9/2006 | Takahashi | A01K 1/0107 604/360 |

* cited by examiner

*Primary Examiner* — Yvonne Abbott-Lewis
(74) *Attorney, Agent, or Firm* — Robert M. Schwartz

(57) ABSTRACT

A pad with adhesive securing elements for animal or pet excretory collection and disposal is provided. The pad includes an absorbent layer centrally located above a generally rectangular excretion impervious liner. The excretion impervious liner extends beyond the perimeter boundary of the absorbent layer. The absorbent layer is centrally affixed to the top of the excretion impervious liner. The bottom of the excretion impervious liner has an adhesive strip adhesively affixed about each of the four corners. The adhesive strips have a non-deployed and a deployed configuration, when deployed, the pad can be secured to a position on a floor or the like. The adhesive strips, whether in their deployed or non-deployed configuration do not extend beyond the perimeter boundary of the excretion impervious liner.

6 Claims, 6 Drawing Sheets

ABSORBING PAD WITH SECURING ELEMENTS FOR PET EXCRETORY COLLECTION AND DISPOSAL

RELATED PATENT APPLICATIONS

This utility patent claims priority from Provisional Patent Application Ser. No. 61/788,114 filed on Mar. 15, 2013 entitled "Pet Pad Design With Adhesive Stickers" which is incorporated herein in its entirety.

BACKGROUND OF THE INVENTION

The present invention relates to absorbent pet pads. Pet owners use these pads to first train their pets to go to the bathroom on the pad and then often times the pads are used thereafter for pets that live or stay primarily inside a dwelling. The pad includes a highly absorbent material portion such as fluff pulp with SAP polymer within a leak proof liner and often is scented to encourage the pet to find the pad when going to the bathroom. When purchased the pads are packaged in large quantities of 50, 100 or 200 pads, though they can be packaged in smaller or larger quantities. However, when so packaged, the pad is folded in half and typically in half again. Thus, when the pad is opened it often does not lie flat. Additionally the pet will often times move the pad either intentionally or not, causing it to buckle or fold over on itself and thus making the pad essentially useless for its intended purpose as a part of the pad is folded over onto itself. Adhesive strips have been placed on the underside of the pad to maintain the pad in a fixed position on a surface such as a floor. However prior to the present invention the alignment of the adhesive strips on the bottom of the pad do not take advantage of the structural aspects of the pad. Specifically, the adhesive strips are not attached at the strongest portion of the underside of the pad causing the adhesive strips to not properly limit the movement of the pad and often times the edges of the strip extend beyond the perimeter or border of the pad. Not only is this unsightly but a pet will often attack or try to move the extended edge causing a failure of the adhesive strip to hold the pad in the desired position.

BRIEF SUMMARY OF THE INVENTION

The present invention is a pet pad having a highly absorbent material atop a larger leak proof liner that has adhesive stickers on its bottom side. The pads of the present invention initially include these adhesive stickers in a non-active or non-deployed position where the adhesive sticker is folded over on itself. When the pad is placed on the floor the adhesive stickers are deployed by opening or unfolding the adhesive sticker so that once opened, the adhesive is exposed, and thus able to adhere the pad to the floor. This keeps the pad in a fixed position on the floor maintaining the pad in the same place it was affixed. The adhesive stickers of the present invention are strategically placed on the underside of the pad to avoid the prior problems of using adhesive stickers on pet pads. The adhesive stickers are "baby diaper" type of stickers (Stay put tabs);

In the present invention the adhesive strip is attached to a supporting portion of the under side of the pet pad. In addition, the adhesive strip is aligned such that a first portion of the adhesive strip, when in the folded position, is aligned with the edge portion of the absorbent material and the second portion does not extend past the peripheral border or edge of the pad when extended. Therefore, the outer edge of the adhesive strip does not protrude from underneath the pad.

DETAILED DESCRIPTION OF THE PREFERRED EMBODIMENT

A description of the preferred embodiment is set forth herein and in the accompanying figures.

Figure 1:
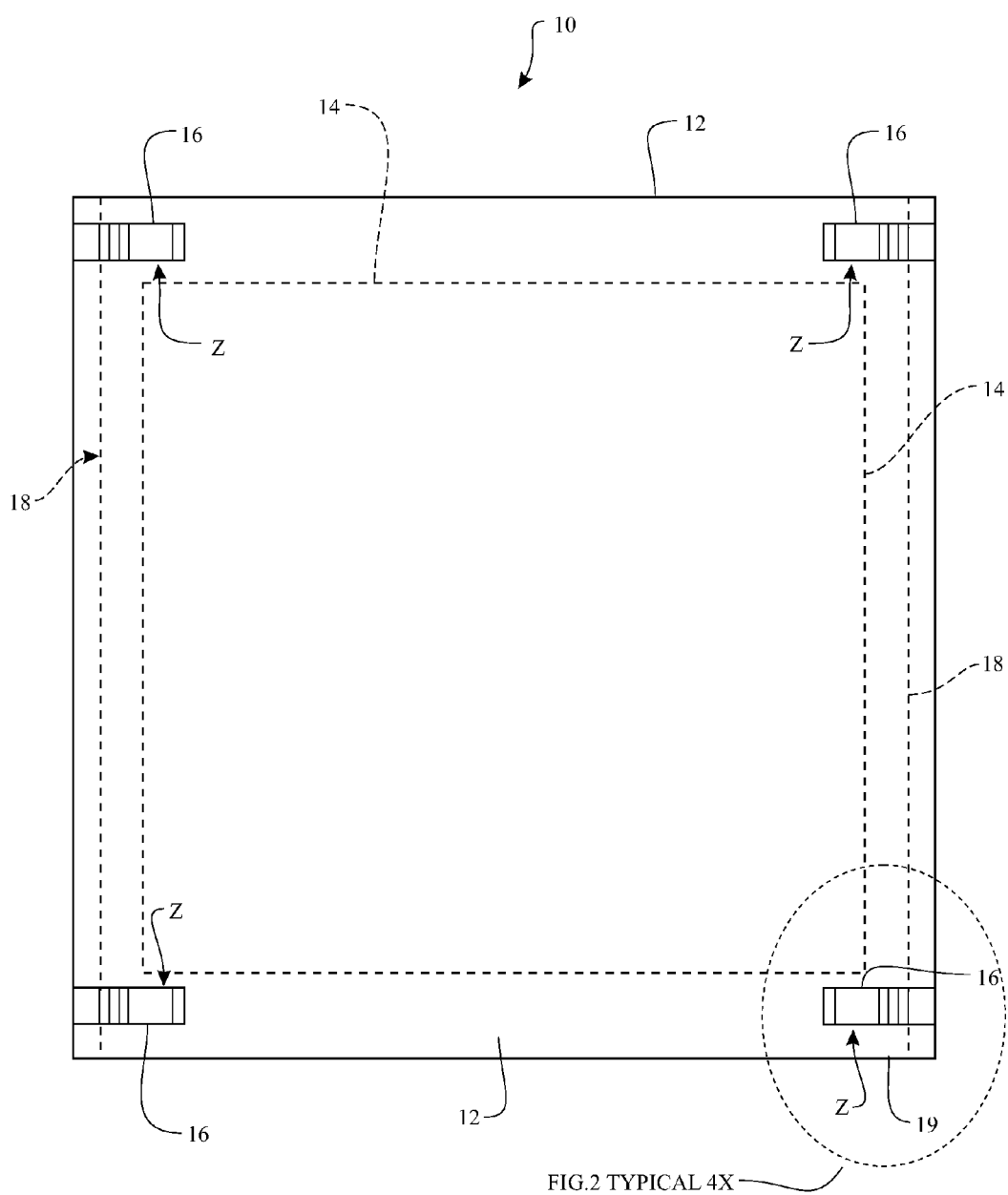
FIG. 1 is a bottom view of the pet pad of the present invention showing locations of adhesive strips.

Referring to FIG. 1 is a bottom view of the pet pad 10 of the present invention, though substantially square, it can be rectangular as well. The pad 10 has a bottom cover layer 12 or liner preferably of a plastic or other material that would contain a liquid or other waste from a pet. The pet pad 10 has a center area of an absorbent material 14 such as fluff pulp with SAP polymer or other highly absorbent material known in the art. In each corner of the bottom cover or liner 12 are adhesive strips 16. Although the pet pad may be used with any animal or even human beings, one of the possible preferred users would be a dog of the species *Canis*. Although often amusing, dogs tend to micturate on vertically disposed objects and other areas for territorial marking. This had the evolutionary benefit of securing possible mates within that territory. These evolutionary impulses are still evident today, as one can easily see dogs urinating on fire hydrants, light poles, trees, brick walls, rocks, bushes and vehicle tires when outdoors. By placing an image of a fire hydrant, or light pole, or tree, brick wall, rock, bush, vehicle tire or the like on the absorbent material 14, one may more easily have such a dog become compliant with using the pad 10 when indoors. These pads can be used by male dogs with the adhesive strips holding the pad to the wall.

Figure 2:
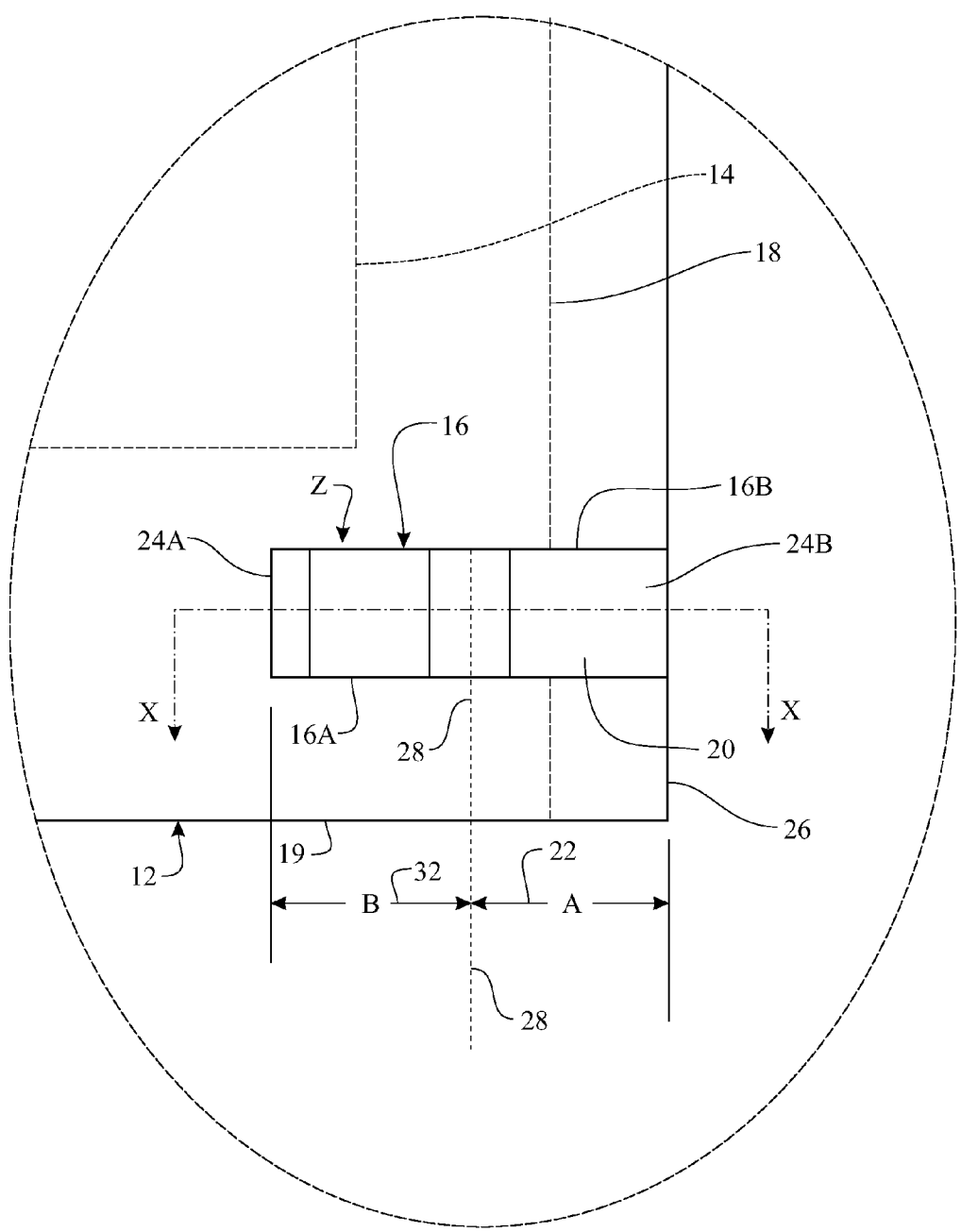
FIG. 2 is an enlarged corner view taken from FIG. 1, magnified approximately four times (4×) showing the position of an adhesive strip on the underside or bottom of the pet pad of the present invention.
Figure 3:
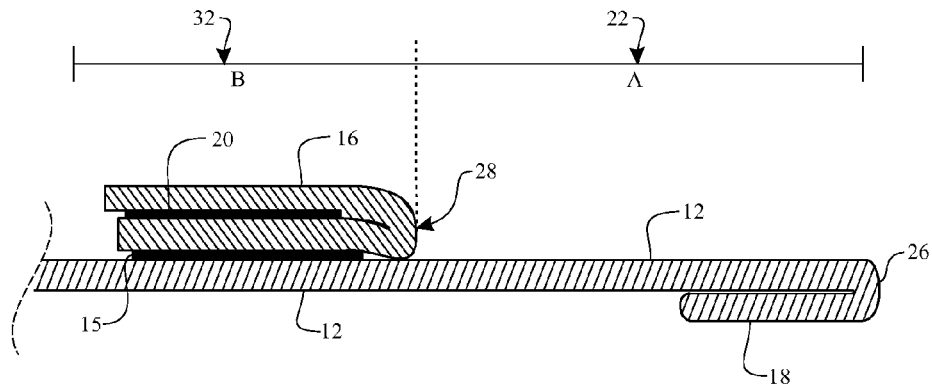
FIG. 3 is a cross section of the adhesive strip (but in the initial closed position) and the pet pad taken from x-x of FIG. 2.
Figure 4:
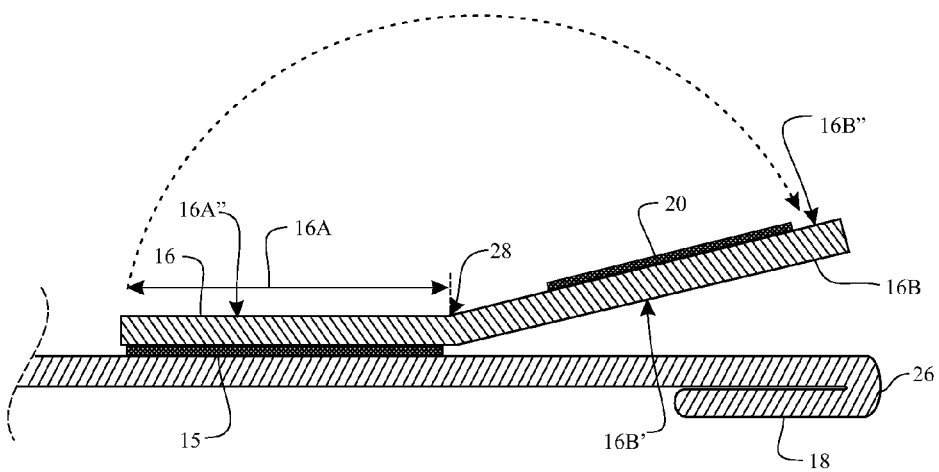
FIG. 4 is another cross section of the adhesive strip (but in a partial open position) and the pet pad taken from x-x of FIG. 2. style.

As shown in FIGS. 2, 3 and 4 adhesive strip 16 includes a first portion 16A and a second portion 16B. First portion 16A has a first side 16A' having an adhesive 15 in contact with bottom cover 12 and a second side 16A" opposite said first side.

Second portion 16B has a first side 16B', on the same side of adhesive strip 16 as the first side of the first portion 16A. Second portion 16B has a second side 16B" opposite its first side. On this second side 16B" of second portion 16B there is an adhesive 20. This adhesive 20 is initially releasably attached to the second side 16A" of first portion 16A. When the pad 10 is in position and ready for use, then the second portion 16B is pulled from first portion 16A, as shown in FIG. 4, so that adhesive 20 will attach to a surface 30, such as a floor surface.

Adhesive strip 16 has a living hinge 28 that separates first portion 16A and second portion 16B. The bottom cover 12 of pad 10 has a return portion or trim 18 that seals the opposed edges of pad 10 to contain any fluids that should reach the edge of pad 10, maintaining said fluids within the confinement of pad 10, preventing leakage onto the floor or other surface the pad is placed.

Figure 5:
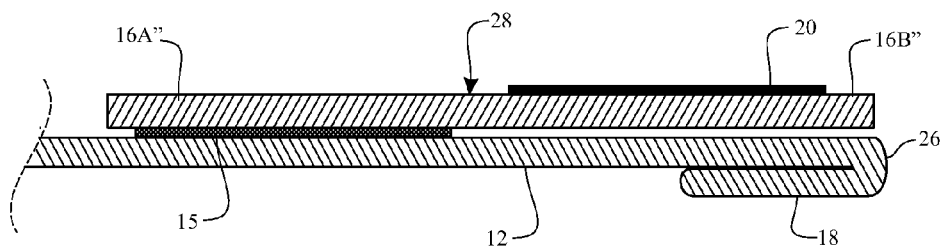
FIG. 5 is a cross section of the adhesive strip and the pet pad taken from x-x of FIG. 2.
Figure 6:
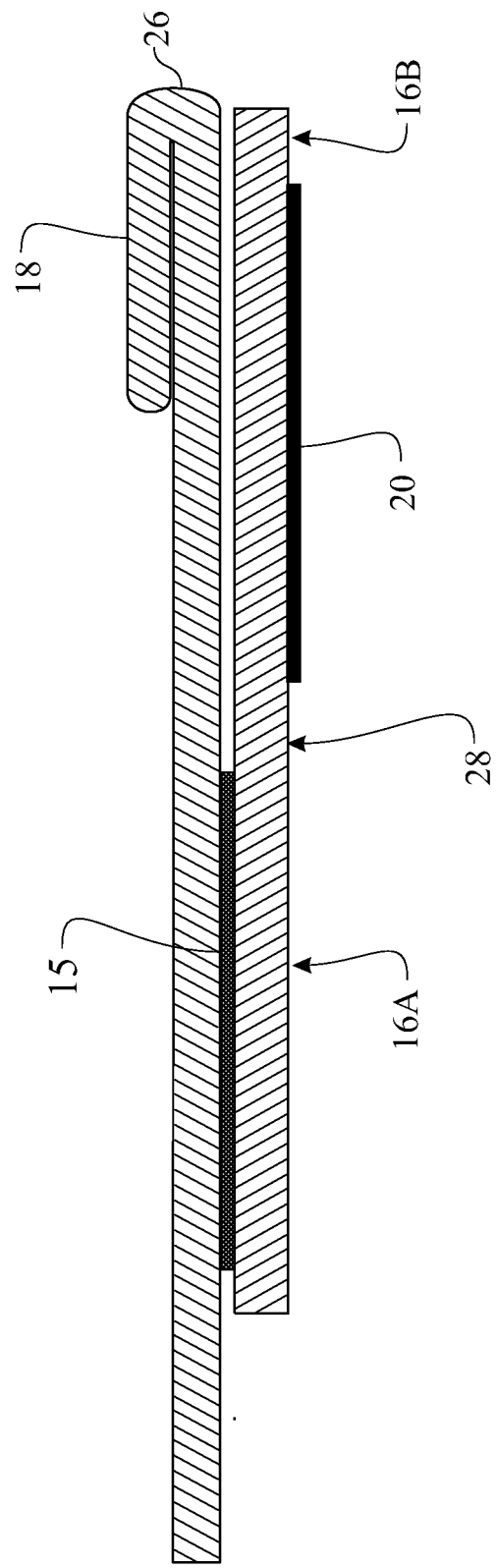
FIG. 6 is another cross sectional view showing the pet pad rotated and fastened to a surface with the adhesive strip.

In use, as seen also in FIG. 6, adhesive strip 16 is in a fully open position as shown in FIG. 5, with adhesive 20 of adhesive strip 16 securing each corner position of pad 10 to a surface 30.

When in use, as shown in FIG. 2, it can be seen that the first portion 16A of adhesive strip 16 is located such that adhesive 15 attaches to cover 12 in a desirable portion Z of pad 10 and includes a first leading portion 24A. This desirable location Z is an area between the edge 19 of pad 10 and the perimeter edge 14' of absorbent material 14 in one direction and spaced sufficiently away from the outside edge 26 of pad 12 and away from the return portion 18 of cover 12 so that when adhesive strip 16 is fully extended the second portion 16B does not extend beyond the edge of pad 10. In this location Z the gripping area of adhesive strip 16 is fully supported on the bottom side of pad 10. Further, this position is such that second portion 16B having an end portion 24B does not extend beyond or not further than the edge 26 of pad 10. This way, the adhesive strip 16 cannot be seen when pad 10 is in a position on a floor 30 as shown in FIG. 6.

Specifically, as shown in FIG. 3, the hinge 28 is located a distance A or 22 from the edge 26 of pad 10 in the linear direction of adhesive strip 16. Further the distance B or 32, the length 32, of portion 16A is less than or equal to the distance 22 such that when portion 16B is opened it does not extend past edge 26.

It has been considered that in some embodiments of the invention, that the return portion 18 may be folded over as far as the perimeter 14' of the absorbent material 14. In this embodiment (not shown), the adhesive strips 16 would be moved an appropriate distance inward, so that when they are deployed or unfolded, no portion of the adhesive strip 16 would extend beyond the boundary of the fold line caused by the return portion 18. Thus the adhesive strips 16 will still not be visible beyond the outside edge 26.

Figure 7:
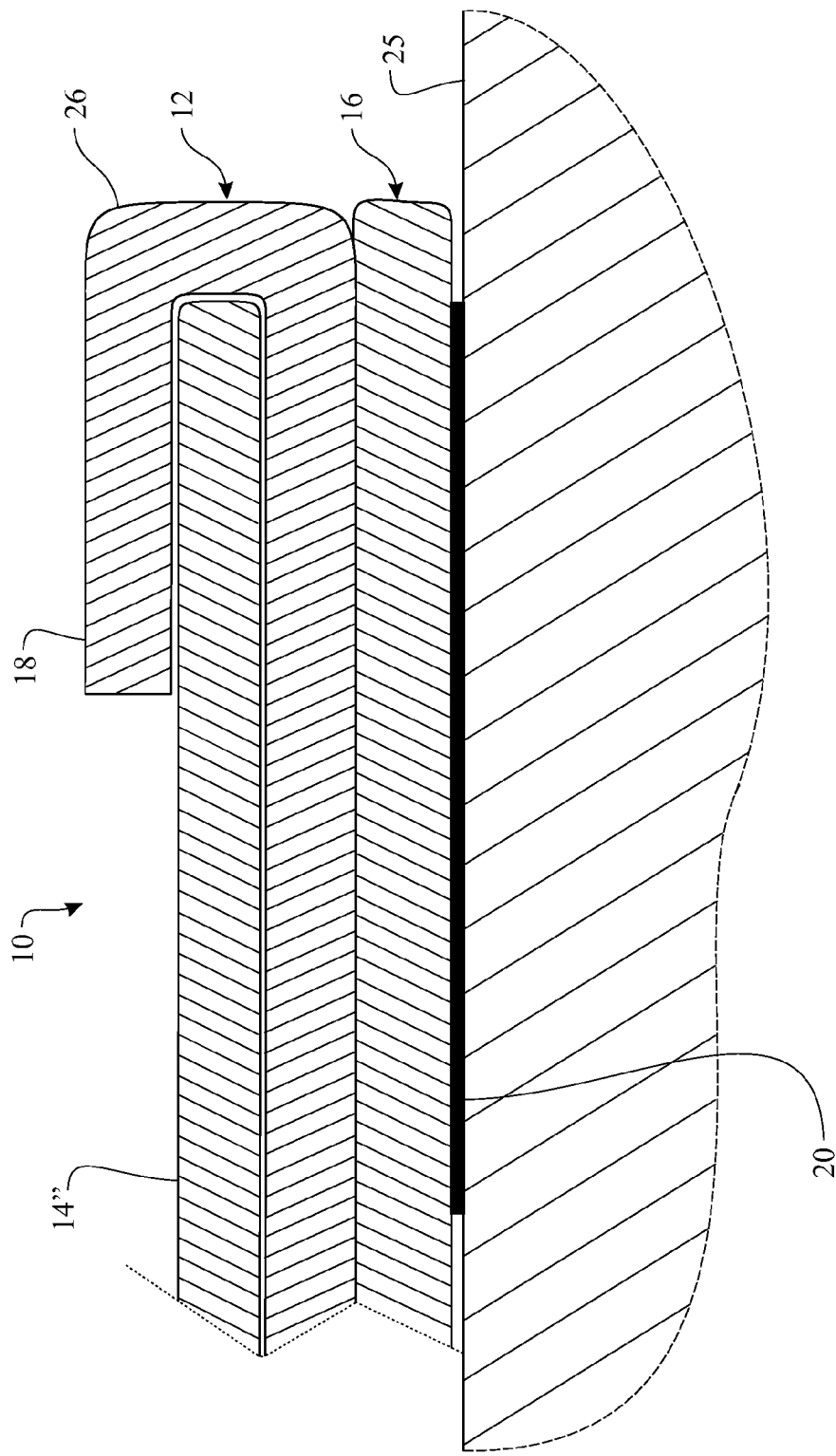
FIG. 7 is a cross sectional view, shown similar to FIG. 6, of an alternate embodiment taken from x-x of FIG. 2, having a separate liner for the absorbent material portion and shown with the pad on a floor or other surface.

FIG. 7 is taken along x-x from FIG. 2 and illustrates an alternate embodiment having the absorbent material attached to or integral with a middle liner 14". Middle liner 14" is a continuous liner having generally in the middle portion an absorbent material. This absorbent material can be attached on liner 14" or it can be integral with liner 14" or some combination thereof. In this embodiment the end of the edge of liner 14" abuts liner 12 and liner 12 wraps around the end of liner 14" such that return 18 wraps around the edge of liner 14" as shown in FIG. 7. Further in this embodiment the absorbent 14 is not seen but absorbent 14 is a part of liner 14". And further, pad 10 is shown attached to floor 25 by adhesive 20 on adhesive strip 16.

Figure 8:
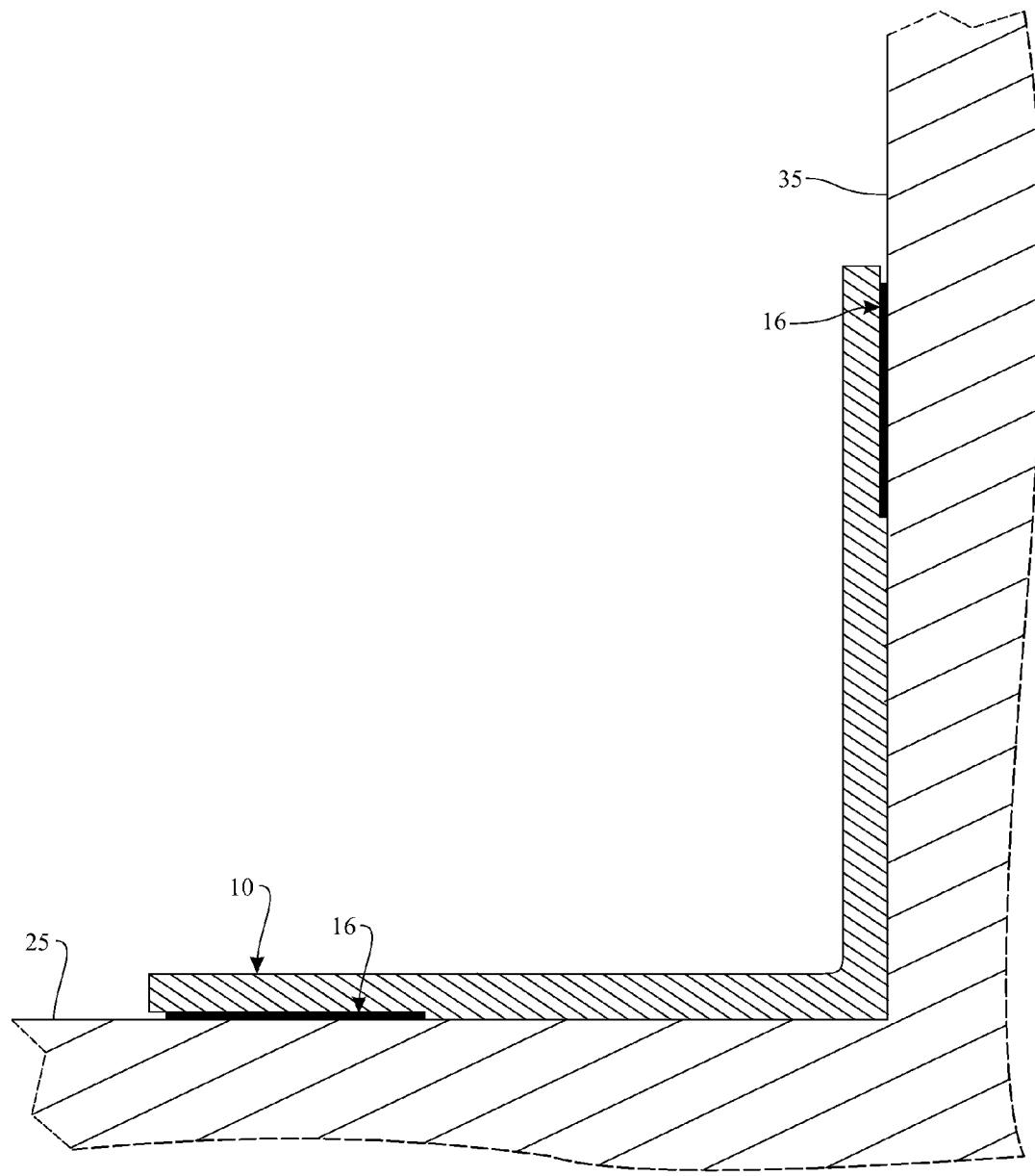
FIG. 8 is a diagramatical sectional view of a partial portion of a floor and a partial portion of a wall showing the pad attached to the floor and to the wall for the use by a male dog.

As seen in FIG. 8, pad 10 is located at the intersection of the floor 25 and wall 35, where pad 10 has a portion attached to horizontal floor 25 with two adhesive strips 16 attached to the floor 25 and a portion attached to the vertical wall 35 with two adhesive strips 16 attached to the wall 35. Preferably about half of pad 10 is adjacent floor 25 and about half of pad 10 is adjacent wall 35.

In FIG. 6, though a floor substrate is not shown, the relationship between the pad 10 and a floor 25 would look substantially similar to that shown in FIG. 7 where pad 10 is attached to a floor 25.

To recap the invention may be described as a pad with adhesive securing elements for animal or pet excretory collection and disposal which has an absorbent layer having a general rectangular configuration, a fluid impervious liner, the liner having a larger rectangular configuration than the absorbent layer, the fluid impervious liner having an upper side, an underside, a right side and a left side, and a width, the absorbent layer centrally disposed on the upper side of the fluid impervious liner, where the fluid impervious liner includes a fold line on the right side, and the rightmost portion of the fluid impervious liner is folded over atop the fluid impervious liner the upper side, forming a right return portion, the right return portion forming a first barrier of the fluid impervious liner the two widths high on the right side and the fluid impervious liner includes a fold line on the left side, and the leftmost portion of the fluid impervious liner is folded over atop the fluid impervious liner the upper side, forming a left return portion, the left return portion forming a second barrier of the fluid impervious liner the two widths high on the left side and the right barrier is parallel to the left barrier and where the absorbent material is intermediate the right barrier and the left barrier and the bottom of the fluid impervious liner has four corners, and each of the corners has an adhesive strip placed proximal to the four corners and each the adhesive strip has a non-deployed configuration and a deployed configuration and each the adhesive strip is adhesively affixed to the bottom side of the fluid impervious liner at a location proximal each of the corners, interior of the right barrier and the left barrier and where the adhesive strips proximal to the right barrier and the left barrier are in their the non-deployed position, a top portion is folded inwardly over a bottom portion, the bottom portion having a first adhesive layer adhesively affixing the adhesive strip in position on the fluid impervious liner, the bottom portion further having an upper portion and where the upper portion of the folded adhesive strip includes a top side and a lower side, the lower side having a second adhesive layer located thereon and when the adhesive strips are deployed, by unfolding the upper portion of the adhesive strip exposing the second adhesive layer, the upper portion is further rotated until it coacts with the underside of the fluid impervious liner, the adhesive strip strategically placed so that the unfolded upper portion does not extend beyond either the right barrier or the left barrier, the second adhesive layer oriented such that it may be affixed to a floor or wall, securing the pad with the absorbent layer in a position to receive any animal or pet excrement, the fluid impervious liner preventing any such waste from penetrating the pad, said first and second barriers adding another element to confine any waste on the pad.

While the invention has been described in its preferred form or embodiment with some degree of particularity, it is understood that this description has been given only by way of example and that numerous changes in the details of construction, fabrication, and use, including the combination and arrangement of parts, may be made without departing from the spirit and scope of the invention.

I claim:

1. A pad with adhesive securing elements for animal or pet excretory collection and disposal comprising:
   an absorbent layer having a general rectangular configuration, a fluid impervious liner, said liner having a larger rectangular configuration than said absorbent layer, said fluid impervious liner having an upper side, an underside, a right side and a left side, and a width, said absorbent layer centrally disposed on said upper side of said fluid impervious liner, said fluid impervious liner includes a fold line on said right side, and said rightmost portion of said fluid impervious liner is folded over atop said fluid impervious liner said upper side, forming a right return portion, said right return portion forming a first barrier of said fluid impervious liner said two widths high on said right side, said fluid impervious liner includes a fold line on said left side, and said leftmost portion of said fluid impervious liner is folded over atop said fluid impervious liner said upper side, forming a left return portion, said left return portion forming a second barrier of said fluid impervious liner said two widths high on said left side, said right barrier is parallel to said left barrier, said absorbent material is intermediate said right barrier and said left barrier, said bottom of said fluid impervious liner has four corners, and each of said corners has an adhesive strip placed proximal to said four corners, each said adhesive strip has a non-deployed configuration and a deployed configuration, and each said adhesive strip is adhesively affixed to said bottomside of said fluid impervious liner at a location proximal each of said corners, interior of said right barrier and said left barrier.

2. A pad with adhesive securing elements for animal or pet excretory collection and disposal as claimed in claim 1 wherein said upper portion of said folded adhesive strip includes a top side and a lower side, said lower side having a second adhesive layer located thereon.

3. A pad with adhesive securing elements for animal or pet excretory collection and disposal as claimed in claim 2 wherein when said adhesive strips are deployed, by unfolding said said upper portion of said adhesive strip exposing said second adhesive layer, and where said upper portion is further rotated until it coacts with said underside of said fluid impervious liner, said adhesive strips strategically placed on said underside of said fluid impervious liner so that said unfolded upper portion does not extend beyond either said right barrier or said left barrier, said second adhesive layers oriented such that it may be affixed to a floor or wall, securing said pad about said four corners with said absorbent layer in a position to receive any animal or pet excrement, said fluid impervious liner preventing any such waste from penetrating said pad, sad first and second barriers adding another element to confine any waste on said pad.

4. A pad with adhesive securing elements for animal or pet excretory collection and disposal as claimed in claim 1 wherein said absorbent layer may include an image printed thereon, said image consisting of a group consisting of fire hydrants, light poles, trees, brick walls, rocks, bushes and vehicle tires.

5. A pad with adhesive securing elements for animal or pet excretory collection and disposal comprising:

an absorbent layer having a general rectangular configuration, a fluid impervious liner, said liner having a larger rectangular configuration than said absorbent layer, said fluid impervious liner having an upper side, an underside, a right side and a left side, and a width, said absorbent layer centrally disposed on said upper side of said fluid impervious liner, said fluid impervious liner includes a fold line on said right side, and said rightmost portion of said fluid impervious liner is folded over atop said fluid impervious liner said upper side, forming a right return portion, said right return portion forming a first barrier of said fluid impervious liner said two widths high on said right side, and said fluid impervious liner includes a fold line on said left side, and said leftmost portion of said fluid impervious liner is folded over atop said fluid impervious liner said upper side, forming a left return portion, said left return portion forming a second barrier of said fluid impervious liner said two widths high on said left side said right barrier is parallel to said left barrier and where said absorbent material is intermediate said right barrier and said left barrier, a said fluid impervious liner has a right edge and a left edge, said right edge co-linear with a rightmost portion of said right barrier, said left edge co-linear with a leftmost portion of said left barrier, and each said adhesive strip has a non-deployed configuration and a deployed configuration, each said adhesive strip is adhesively affixed to said bottomside of said fluid impervious liner at a location proximal each of said corners, interior of said right barrier and said left barrier, and wherein when said adhesive strips proximal to said right barrier and left barrier are in their said non-deployed position, a top portion is folded inwardly over a bottom portion, said bottom portion having a first adhesive layer adhesively affixing said adhesive strip in position on said fluid impervious liner, said bottom portion further having an upper portion, where said upper portion of said folded adhesive strip includes a top side and a lower side, said lower side having a second adhesive layer located thereon.

6. A pad with adhesive securing elements for animal or pet excretory collection and disposal as claimed in claim 5 where when said adhesive strips are deployed, by unfolding said said upper portion of said adhesive strip exposing said second adhesive layer, said upper portion is further rotated until it coacts with said underside of said fluid impervious liner, said adhesive strips strategically placed so that said unfolded upper portions does not extend beyond either said right barrier or said left barrier, said second adhesive layer oriented such that it may be affixed to a floor or wall, securing said pad about said four corners with said absorbent layer in a position to receive any animal or pet excrement, said fluid impervious liner preventing any such waste from penetrating said pad, sad first and second barriers adding another element to confine any waste on said pad.

\* \* \* \* \*